Jan. 12, 1932.  A. PAULSEN  1,840,327

ARTICLE HANDLING APPARATUS

Filed Oct. 3, 1927  5 Sheets-Sheet 1

INVENTOR.
Alex Paulsen
BY
Bolton, Hadwell, Lecher, McKenna and Michael
ATTORNEY.

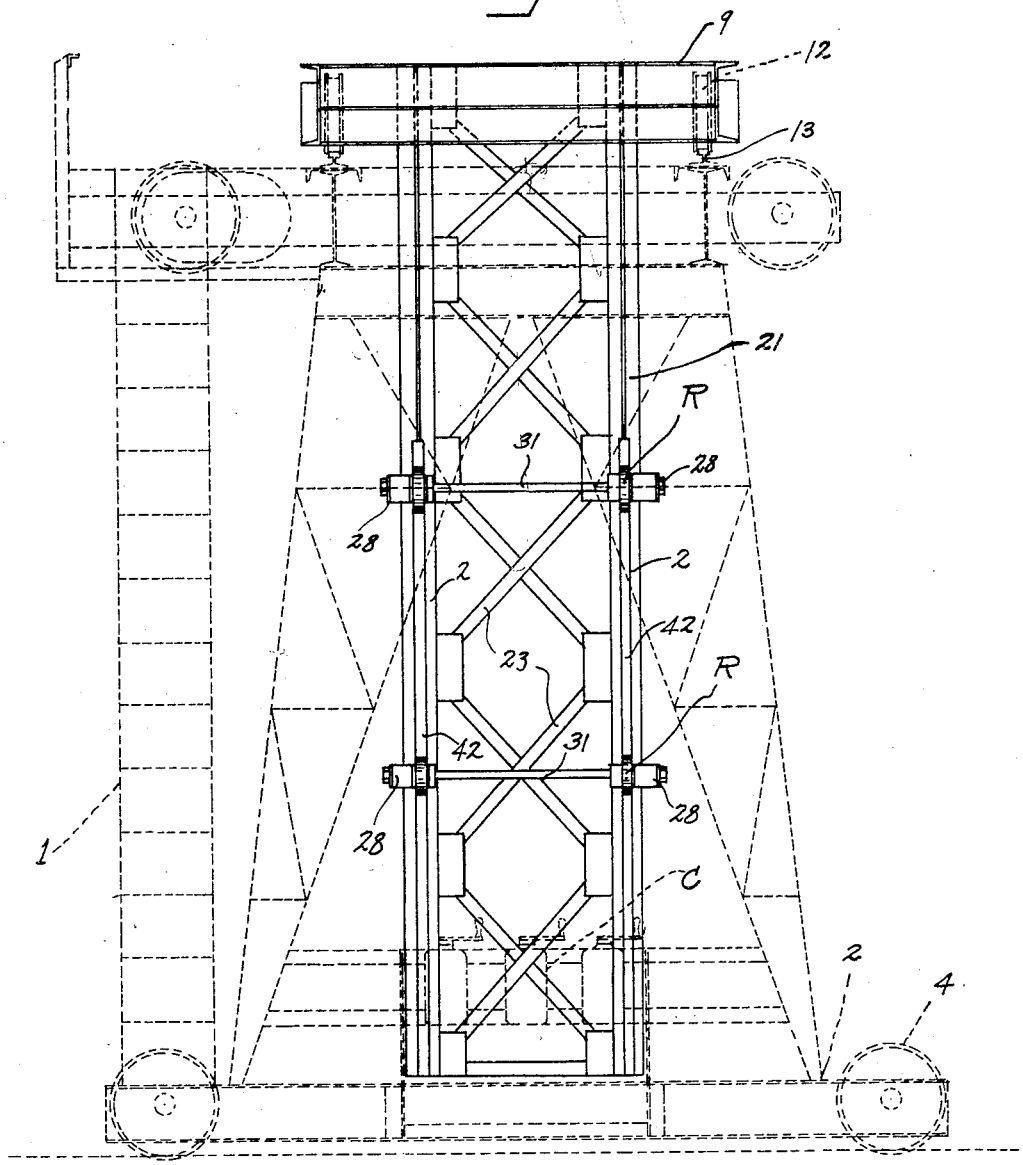

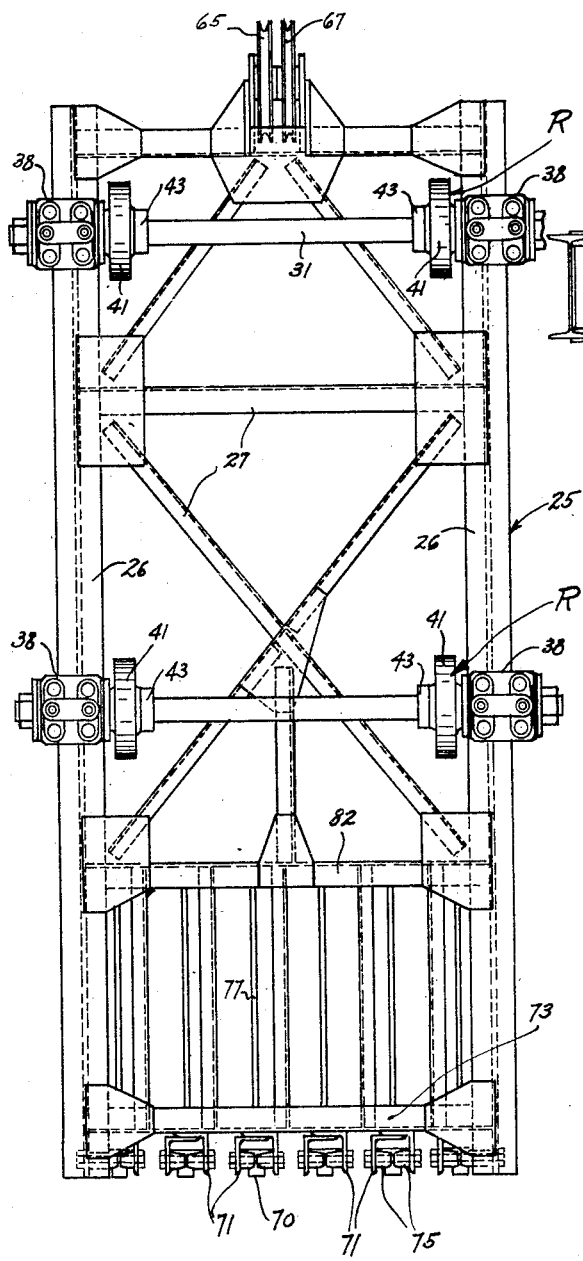
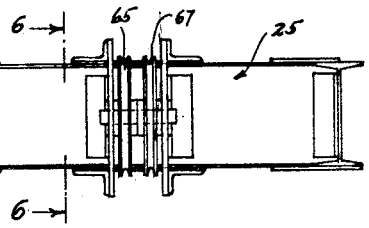
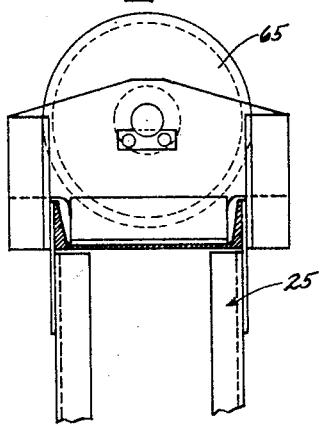

INVENTOR.
Alex Paulsen
BY
ATTORNEY.

INVENTOR.
Alex Paulsen
BY
ATTORNEY.

Patented Jan. 12, 1932

1,840,327

UNITED STATES PATENT OFFICE

ALEX PAULSEN, OF LAKE, WISCONSIN, ASSIGNOR, BY MESNE ASSIGNMENTS, TO HARNISCHFEGER CORPORATION, OF MILWAUKEE, WISCONSIN, A CORPORATION OF WISCONSIN

ARTICLE HANDLING APPARATUS

Application filed October 3, 1927. Serial No. 223,526.

This invention relates in general to an article handling apparatus and although well adapted to carry out the handling and transporting operations incident to the annealing of heavy castings is also well adapted for practically universal application.

In annealing castings, especially the larger and heavier ones, the problem of handling the castings is one of serious difficulty and annoyance. The castings have to be placed in the annealing ovens and removed therefrom while hot in order that the rate of cooling of the castings may be controlled. In some instances the hot castings must be dipped in a bath of oil or other liquid and afterwards they must be transported and deposited in a place of storage.

One of the objects of the present invention is to provide an article handling apparatus which may be advantageously used for charging annealing ovens, effecting the removal of the castings from the annealing ovens, and their subsequent handling. More particularly the present invention proposes to carry the castings into the annealing oven and deposit them in proper position thereon. Then when the castings have been subjected to the desirable heat treatment the apparatus embodying the present invention may be again moved into the annealing oven to pick up the castings and carry them out of the oven, dip them in an oil or other liquid bath, if desired, and afterwards transport them to and deposit them at the place of storage.

Briefly, the embodiment of the present invention set forth in this application comprises a traveling crane, which may be of gauntry type, a motor driven trolley on the traveling crane, a depending guide carried by the trolley, a lifting frame constrained to vertical sliding movement along the guide, a plurality of horizontal lifting elements or rails supported on the lifting frame and a motor driven drum on the trolley operatively connected with the lifting frame for raising and lowering the lifting frame and its rails. The traveling crane travels back and forth in front of the annealing ovens and to points adjacent the places of storage. The motor driven trolley is movable along a track provided therefor on the beams of the crane so that it can be actuated to run the lifting rails into the oven and also to move them back out of the oven. The raising and lowering means permits of the deposit of the castings or the like on the fixed rails or other supports provided therefor in the annealing ovens and also enables the lifting rails to engage and raise the castings off of the supporting rails of the oven and to carry them out of the oven. The traveling crane runs over the tank or pit containing the bath of oil or other liquid and by lowering the lifting frame and its rails to a sufficient extent the castings may be immersed in the bath. The castings may also be transported and deposited at the place of storage by suitably raising the lifting rails, running the crane to a point adjacent the place of storage and then manipulating the trolley and the raising and lowering means to carry out this purpose. The lifting means is of novel construction and is made up of a plurality of spaced and elongated lifting rails which are substantially rigid and are rigidly though adjustably supported on the lifting frame. Between the lifting frame and the guide frame novel roller arrangements are provided to positively constrain the lifting frame to sliding movement and as the guide frame is itself rigid and is rigidly connected to the trolley, the lifting elements may be positively moved in a horizontal plane by actuating the trolley.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 1 is a view partly in side elevation and partly in vertical section showing one embodiment of the present invention in use with an annealing oven and the oil bath pit;

Figure 2 is a view in end elevation looking towards the left in Figure 1, the crane being shown in dotted lines and the trolley and parts being carried thereby being shown in full lines;

Figure 3 is a plan view of the trolley;

Figure 4 is a view in end elevation of the lifting frame;

Figure 5 is a plan view thereof;

Figure 6 is a fragmentary sectional view on line 6—6 of Figure 5;

Figure 7:
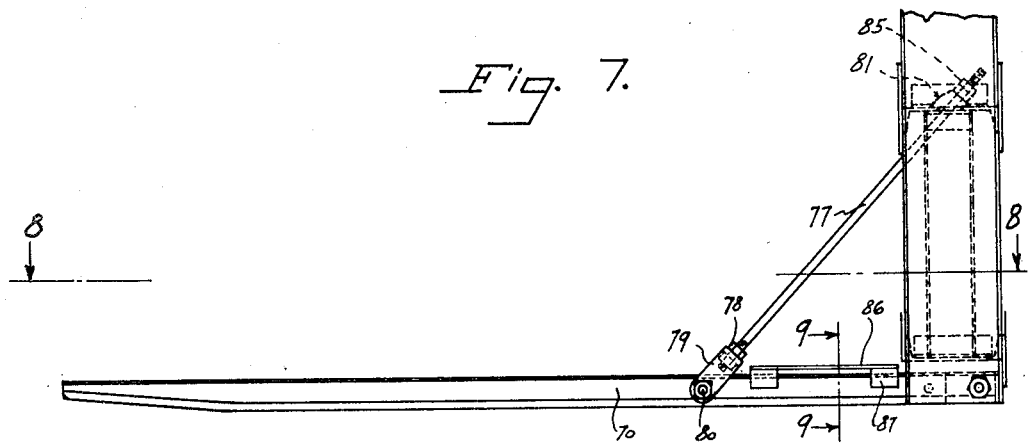
Figure 7 is a fragmentary view in side elevation showing the lower part of the lifting frame and the lifting rails carried thereby.
Figure 8:
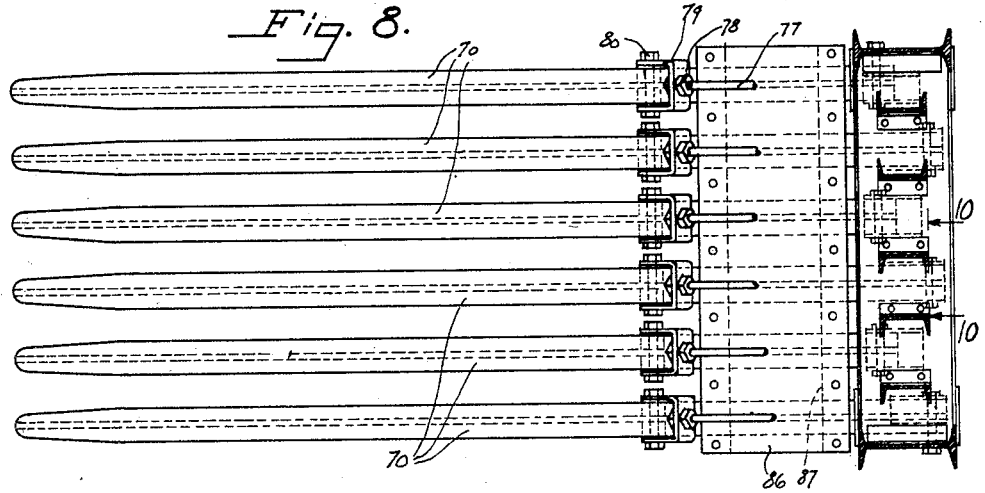
Figure 8 is a sectional view on line 8—8 of Figure 7.

Referring to the drawings numeral 1 designates generally a traveling crane shown for the sake of illustration as being of the gauntry type, but, of course, any suitable type of traveling crane may be employed. In the embodiment shown the crane has a vertical frame or leg 2 and a horizontal frame or beam 3, the leg 2 and beam 3 being suitably constructed and having rollers or wheels 4 and 5 which ride on suitable rails 6 and 7, respectively. A platform 8 is provided on the crane and carries the controllers C whereby the electric motor which drives the crane in the conventional manner as well as the electric motors employed for driving the trolley and the raising and lowering means may be operated as desired.

A trolley designated generally at 9 is mounted on the crane and may be of any suitable construction. Preferably, the trolley 9 has a frame 10 supported by wheels 11 and 12 on rails 13 carried by the beam 3 of the crane. The wheels 12 are motor driven being actuated from an electric motor 14. Between the electric motor 14 and the wheels 12 suitable gearing or motion transmission mechanism 15 is provided. This means for driving the wheels 12 is of conventional construction and is widely used on the motors of electric cranes and elsewhere, so that no detail description is required.

Suitable braced cross members 20 are incorporated in the structure of the frame 10 of the trolley 9 and carry a depending guide frame 21 made up of spaced legs 22 interconnected and braced as indicated at 23 (see Figure 2). In this way the guide frame is itself rigid and is rigidly supported on the trolley.

A lifting frame designated generally at 25 is provided and is mounted for vertical sliding movement along the guide frame 21. The lifting frame 25 is shown in detail in Figure 4 and in general comprises a pair of vertical side members 26 interconnected and braced as at 27 to provide a rigid structure.

Means is provided for constraining the lifting frame 25 to vertical sliding movement on and relative to the guide frame 21 and this means consists of a plurality of vertically spaced guide roller arrangements designated generally at R, the guide roller arrangements R being mounted on the lifting frame and engaging the guide frame to constrain the lifting frame to vertical movement in all adjustment of the lifting frame.

Figure 11:
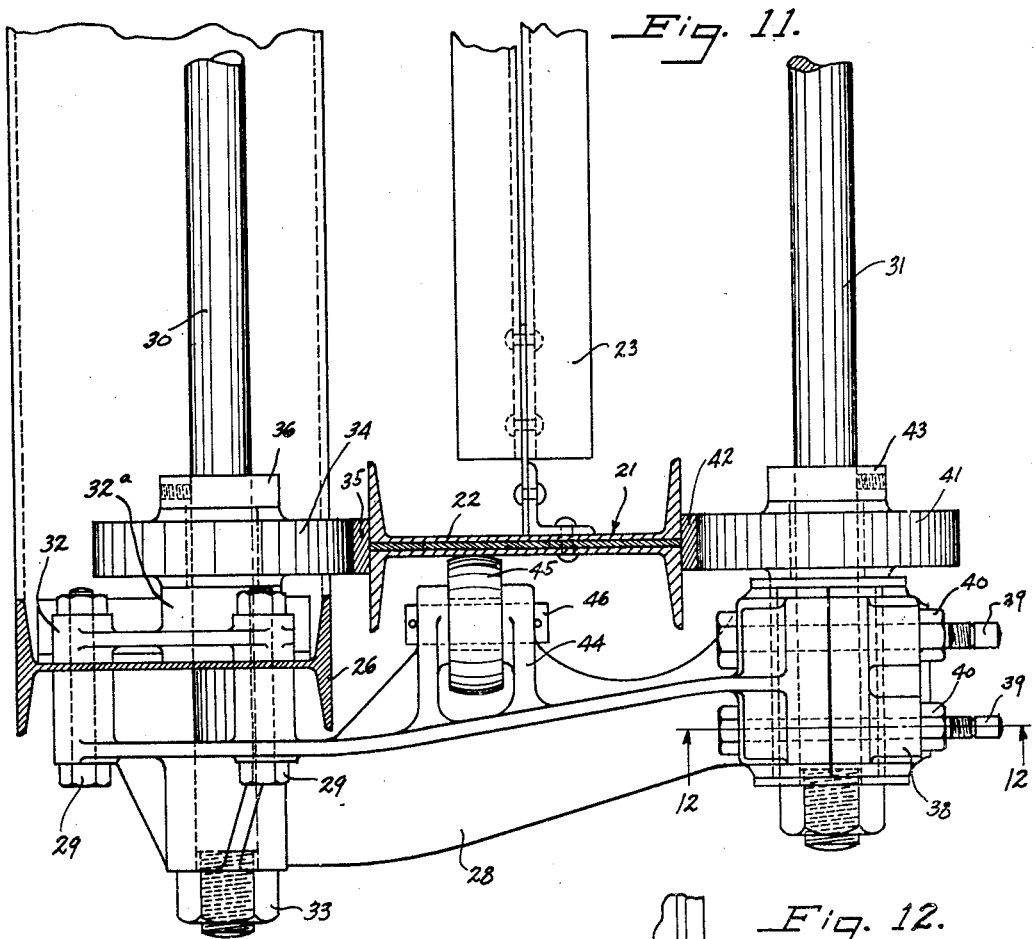
Figure 11 is an enlarged fragmentary sectional view on line 11—11 of Figure 1.
Figure 13:
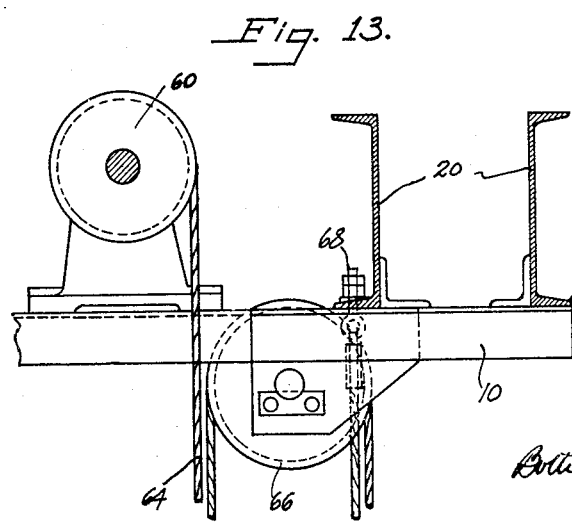
Figure 13 is a fragmentary detail view partly in elevation and partly in section, the plane of the section being along line 13—13 of Figure 3.
Figure 12:
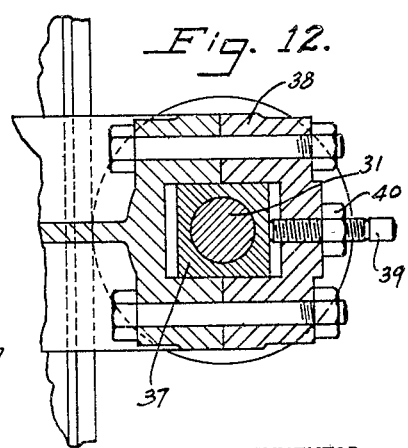
Figure 12 is a detail sectional view on line 12—12 of Figure 11.

Each guide roller arrangement consists of a pair of heavy brackets 28, one such bracket 28 being bolted as at 29 to each of the legs 26 of the lifting frame (see Figures 1 and 11). The brackets 28 of each guide roller arrangement are connected with each other by means of cross shafts 30 and 31. The cross shaft 30 extends through the legs 26 of the lifting frame, through the brackets 28 and also through brackets 32 which are fastened to the legs opposite the brackets 28 and held in position by the same nuts and bolts 29 that fasten the brackets 28 to these legs 26. Nuts 33 secure each shaft 30 in position. Rollers 34 are rotatably mounted on each shaft 30 and engage wear strips 35 provided on the legs 22 of the fixed guide frame 21. The rollers 34 are prevented from being displaced axially by virtue of their engagement with bosses $32^a$ provided on the brackets 32 and with set collars 36 secured to the shafts 30. Each shaft 31 is mounted adjacent its ends in floating blocks 37 mounted for sliding movement in sectional bearing boxes 38 provided at the ends of the brackets 28. Set screws 39 are threaded into sections of the bearing boxes 38 and engage the blocks 37 to regulate the position of these boxes and of the shaft 31 which they carry. Jam nuts 40 are mounted on the set screws 39 to secure the screws in proper adjustment. Rollers 41 are rotatably mounted on the shaft 31 and engage wear strips 42 provided on the legs 22 of the fixed guide frame 21. Set collars 43 coact with the bearing boxes 38 to prevent the rollers 41 from moving axially along the shaft 31.

Intermediate their ends the brackets 28 have an inwardly directed pair of apertured lugs designated at 44. On each pair of lugs 44 a roller 45 is mounted, the roller 45 being rotatably fitted on a pin 46 secured in the apertures of the lugs. The legs 22 are of I-shape in cross section and the rollers 45 engage the webs of these legs 22 while the wear strips 35 and 42 engaged by the rollers 34 and 41 are mounted on the flanges of these legs, as shown in Figure 11.

With this arrangement the lifting frame cannot sway or move in any direction horizontally but is constrained to movement vertically along the guide frame 21, the guide rollers preventing both transverse and fore and aft movement in a horizontal plane.

Means is provided for raising and lowering the lifting frame 25 and this means consists of a hoisting drum 60 mounted on the trolley 9 and driven from an electric motor 61 through the usual gearing 62. In this gearing 62 the conventional load brake is incorporated, this load brake performing its usual function of regulating the speed of the load in the lowering direction and, with the assistance of the electromagnetic brake 63 of the motor, of holding the load suspended when the motor 61 is shut off. This electromagnetic brake is of conventional construction and includes spring means for setting the brake and an electromagnetic release for the brake which is energized when the motor 61 is running and de-energized when the motor 61 is shut off. This is conventional crane equipment and requires no detail explanation here. A flexible element 64 such as a cable, rope, or the like, is secured to and wound on the drum 60 and is extended down under and around a pulley 65 provided on the upper end of the lifting frame 25, and then up and over a pulley 66 provided on the trolley 9, then down around and under a pulley 67 mounted on the lifting frame 25 adjacent the pulley 65 and then up to the trolley whereon it is dead-ended or anchored as at 68 (compare Figures 1, 4 to 6, and 13). Cooperating stops may be provided on the guide and lifting frames to limit the extent to which the lifting frame may be lowered and the conventional crane limit switch is used to limit the upward movement of the lifting frame.

Figure 9:
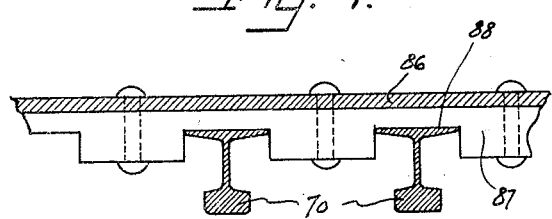
Figure 9 is a fragmentary sectional view on line 9—9 of Figure 7.
Figure 10:
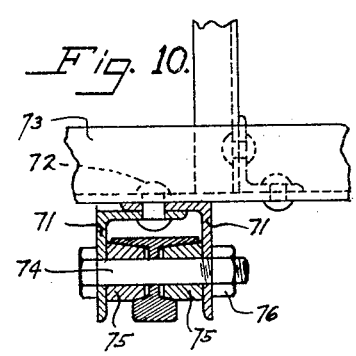
Figure 10 is fragmentary sectional view on line 10—10 of Figure 8.

A plurality of horizontally disposed and elongated lifting elements or rails designated generally at 70 is provided, these rails being carried by the lifting frame 25 so as to be constrained to partake of the movements thereof. Each lifting element 70 may be constituted of an inverted rail having one end received between a pair of angle brackets 71 riveted as at 72 to a transverse member 73 of the lifting frame. The rearward end portion of each lifting element is provided with spaced openings and through one of these openings a pivot pin 74 is extended, the pivot pin also passing through one of a plurality of sets of openings in the bracket 71 and through openings in wedge shaped spacing bushings 75. By having a plurality of openings the pivot pins of adjacent lifting rails are spaced or staggered to permit the brackets to be placed close together and the lifting rails to be independently removed and replaced. When the nut 76 on the bolt or pin 74 is tightened up, the bolt is screwed in position and the wedge shaped bushings firmly engaged with the lifting element as shown in Figure 10 thereby properly positioning the lifting element. Each lifting element is further supported by means of a supporting rod 77 having its lower end adjustably connected as at 78 to a yoke-shaped bracket 79 pivotally connected as at 80 to its lifting element 70. The upper end of each rod 77 passes through a suitably shaped boss 81 provided on a transverse member 82 of the frame 25. The transverse member 82 is braced and connected with the frame member 73 by standards which may be of channel shape. The upper extremity of each rod 77 projects beyond its boss 81 and has nuts 85 threaded thereon. By adjusting the connection of the supporting rod with the transverse member 82 or by adjusting its connection with its yoke 79, the lifting element may be raised or lowered to properly position it vertically. These lifting elements are maintained in proper spaced relation by action of the wedge bushing 75 and by means of a plate 86 which has a spacer strip 87 fixed to its underside and notched as at 88 to receive the lifting rails 70 and hold them in proper position (see Figure 9).

In Figure 1 an annealing oven is designated generally at A and has the usual door D which may be opened and closed in the usual manner. The bottom of the annealing oven is provided with spaced rails or supports designated at S and in between these rails S the lifting elements or lifing rails 70 are designated at S and in between these hails of the lifting elements 70 may be beveled off as indicated at 70ª. At a suitable point, a pit containing a bath of oil designated at O is provided. At the place of storage the castings are also mounted on rails similar to the rails S.

In operation the lifting element or rails 70 are run under castings while the lifting rails are in a lowered position and these rails are then elevated to lift the castings off of their fixed supporting rails whereupon the castings are supported entirely on the lifting rails. The trolley 9 is then moved to the desired position on the crane. The crane 1 may then be driven to carry the trolley lifting frame and lifting rails together with the casting supported on the lifting rails to a position in front of the annealing oven. With the door of the annealing oven open the trolley 9 is driven by its motor 14 to advance the lifting rails into the oven until the castings are properly positioned therein. The motor driven drum 60 is then actuated to lower the lifting rails 70 to a position below the fixed rails S of the oven so as to deposit the castings on the fixed rails of the oven. With the lifting rails lowered the trolley 9 is backed out to withdraw the lifting rails 70 from the oven. After the castings have been heated for the desired length of time the trolley is again advanced to project the lifting rails into the oven and the door of the annealing oven need be open only slightly for this purpose. The motor driven drum 60 is then actuated to elevate the lifting rails 70 to cause them to engage and support the castings in spaced relation to the fixed supporting rails S. The trolley 9 is then moved rearwardly away from the oven to carry the lifting rails 70 with the castings thereon out of the oven. When over the pit O the motor driven drum 60 may be actuated to lower the lifting rails 70, as shown in Figure 1, whereby to immerse the castings in the bath of oil, or in the bath of other liquid provided in the pit. After this treatment has been completed the motor driven drum 60 is actuated to raise the lifting rails 70 and the castings out of the pit. The traveling crane 1 is then run down its track to a point opposite the place of storage. The trolley 9 is then run back or forward as may be desired and the lifting rails are lowered to deposit the castings on the fixed supporting rails provided at the place of storage. The lifting rails may then be withdrawn from beneath the castings for a repetition for the operation with other castings or for other purposes. While the invention has been described as applied to the handling of castings it is not to be restricted to this particular application as it is capable of equally advantageous use in many other diverse instances, and with various articles and materials.

The invention claimed is:

1. An apparatus of the character described having a lifting frame, including a transverse member, a plurality of spaced brackets carried by said member, lifting rails having ends connected with said brackets, the connections between the ends of said rails and said brackets being staggered one with respect to another and rods connected with the frame and connected to intermediate portions of the rails.

2. An apparatus of the character described having a lifting frame, including a transverse member, a plurality of spaced brackets carried by said member, lifting rails having ends connected with said brackets, rods connected with the frame and connected to intermediate portions of the rails for preventing angular movement of said rails with respect to said frame and means for maintaining the rails in spaced relations.

3. An apparatus of the character described, comprising a trolley, a guide frame depending from the trolley and having its upper end rigidly secured thereto whereby the guide frame is supported on the trolley and constrained to move therewith, said guide frame including spaced vertical legs and cross bracing rigidly interconnecting the legs, a lifting frame including spaced side members adjacent the legs of the guide frame, cross bracing rigidly interconnecting said side members, means carried by the trolley for raising and lowering the lifting frame, brackets fixed to the side members of the lifting frame and overlapping the vertical legs of the guide frame, rollers carried by said brackets and engaging opposed surfaces of the legs to constrain the lifting frame to vertical movement along the guide frame and substantially horizontal elongated lifting elements carried by the lifting frame adjacent the lower end thereof.

4. An apparatus of the character described, having a lifting frame including a transverse member adjacent the lower end thereof, a plurality of pairs of spaced brackets carried by said member, a plurality of lifting rails, each lifting rail having one end positioned between the members of one of said pairs of brackets, pivot bolts traversing each pair of brackets and the end of the associated rail, and wedge-shaped bushings mounted on the pivot bolts and co-operable with the rails to tend to properly position them, a second transverse member carried by the lifting frame intermediate its ends, and means connecting said second transverse member and an intermediate portion of the lifting rails to complete the proper supporting of the lifting rails on the lifting frame.

In witness whereof, I hereto affix my signature.

ALEX PAULSEN.